US006711890B2

(12) United States Patent
McGuire

(10) Patent No.: US 6,711,890 B2
(45) Date of Patent: Mar. 30, 2004

(54) PRESSURE-ACTUATED JOINT SYSTEM

(75) Inventor: John R. McGuire, Garland, UT (US)

(73) Assignee: Alliant Techsystems, Inc., Edina, MN (US)

( * ) Notice: Subject to any disclaimer, the term of this patent is extended or adjusted under 35 U.S.C. 154(b) by 0 days.

(21) Appl. No.: 10/132,950

(22) Filed: Apr. 26, 2002

(65) Prior Publication Data

US 2003/0163986 A1 Sep. 4, 2003

Related U.S. Application Data

(60) Provisional application No. 60/289,590, filed on May 8, 2001.

(51) Int. Cl.$^7$ .................................................. F02K 9/00
(52) U.S. Cl. ........................................................ 60/253
(58) Field of Search ................ 60/253, 255; 220/592.2; 277/927

(56) References Cited

U.S. PATENT DOCUMENTS 5,570,573 A * 11/1996 Bonnelie ..................... 60/253

OTHER PUBLICATIONS

What Went Wrong—Onlineethics.org, http://onlineethics.org/moral/boisjoly/rocket.html, Jul. 23, 2003, see the joints reproduction from p. 57 of the Presidential Commission Report on the Space Shuttle Challenger Accident, and the RSRM view reproduced from p. 52 of the Same Report.*

* cited by examiner

Primary Examiner—Ehud Gartenberg
(74) Attorney, Agent, or Firm—TraskBritt

(57) ABSTRACT

A pressure vessel is provided that includes first and second case segments mated with one another. First and second annular rubber layers are disposed inboard of the first and second case segments, respectively. The second annular rubber layer has a slot extending from the radial inner surface across a portion of its thickness to define a main body portion and a flexible portion. The flexible portion has an interfacing surface portion abutting against an interfacing surface portion of the first annular rubber layer to follow movement of the first annular rubber layer during operation of the pressure vessel. The slot receives pressurized gas and establishes a pressure-actuated joint between the interfacing surface portions. At least one of the interfacing surface portions has a plurality of enclosed and sealed recesses formed therein.

24 Claims, 11 Drawing Sheets

↑ FORWARD END

PRESSURE-ACTUATED JOINT SYSTEM

RELATED APPLICATION

This application claims the benefit of priority of U.S. provisional application 60/289,590 filed in the U.S. Patent & Trademark Office on May 8, 2001, the complete disclosure of which is incorporated herein by reference.

GOVERNMENT LICENSING CLAUSE

The U.S. Government has a paid-up license in this invention and the right in limited circumstances to require the patent owner to license others on reasonable terms as provided by the terms of NAS8-97238 awarded by the National Aeronautics and Space Administration (NASA).

BACKGROUND OF THE INVENTION

1. Field of the Invention

This invention is directed to sealing joints for mated bodies. In a particularly preferred embodiment the invention is directed to a pressure-actuated joint, especially a pressure-actuated joint of a solid rocket motor, such as a reusable solid rocket motor.

2. State of the Art

Reusable solid rocket motor (RSRM) designs can be found in many rocketry applications, with perhaps the best known application involving the two solid rocket boosters of the Space Shuttle. The solid rocket boosters of the Space Shuttle are attached to opposite sides of a main external tank of the Space Shuttle. On the launch pad, the two solid rocket boosters, and in particular the cases of the boosters, structurally support the entire weight of the external tank and orbiter and transmit the weight load through their structure to the mobile launch platform. Together, the solid rocket boosters furnish the majority of the thrust required to launch the Space Shuttle from its mobile launch platform and contribute to accelerate the vehicle to more than about 4800 km per hour (3,000 miles per hour) before detaching and separating from the external tank.

FIG. 1 illustrates an example of an RSRM of the Space Shuttle vehicle. The RSRM is generally designated by reference numeral 10 in FIG. 1. The RSRM 10 comprises a plurality of detachable segments connected to each other by field joints 12 and factory joints 14, as identified in FIG. 1. The term "field joint" is commonly used in the field of rocketry to denote joints capable of being assembled in either a factory or the field. The field joints 12 and segmented design provides maximum flexibility in transportation, handling, recovery, refurbishment, assembly, and fabrication of the RSRM 10. For example, the segmenting of the solid rocket motor facilitates propellant casting procedures and permits transportation of the large segments on heavy-duty railcars incapable of carrying the assembled RSRM 10.

FIG. 2 illustrates the major segments of each RSRM 10 of the Space Shuttle vehicle by depicting the RSRM 10 in an exploded view. Proceeding from the forward end to the aft end of the RSRM 10, the RSRM 10 comprises a nose cap 30, a frustum forward cap 32 containing forward separation motors, a forward skirt 34, a forward segment 20, a forward-center segment 22, an aft-center segment 24, an aft segment 26, an exit cone 36, and an aft skirt 38. The forward segment 20, forward-center segment 22, aft-center segment 24, and aft segment 26 each contain a solid propellant grain structure, which is illustrated as a center-perforated propellant grain structure 40. The forward segment 20 also contains an igniter assembly (not shown in FIGS. 1 and 2) installed at the forward end of the center-perforated propellant grain structure 40.

The RSRM 10 includes an outer case (unnumbered in FIGS. 1 and 2) that surrounds the center-perforated propellant grain structure 40. Like the propellant grain structure 40, the outer case is also of a segmented design. In particular, each of the segments 20, 22, 24, and 26 has a corresponding annular outer case segment containing a segmented portion of the propellant grain structure 40. Although not apparent from FIGS. 1 and 2, interposed radially between the propellant grain structure 40 and each of the outer case segments are insulation and liner layers. The insulation layer protects the outer case from the heat and particle streams generated during combustion of the propellant grain structure 40. The liner bonds the propellant grain structure 40 to the insulation and/or any non-insulated portions of the outer case. In addition to its adhesive function, the liner may also serve the additional functions of inhibiting an approaching flame front of the burning propellant grain 40 and contributing to the prevention of leakage of combustion gases or liquid to the outer case.

Special precautions must be taken at the field joints 12 between connected segments—i.e., segments 20 and 22, segments 22 and 24, and segments 24 and 26—to prevent hot combustion gases from escaping past the insulation and reaching the outer case. Penetration of the combustion gases through the insulation can create an extremely hazardous condition.

Thus, there is a strong interest in the art, as well as public interest, to continue improving upon the field joints of a rocket motor, especially rocket motor components of manned vehicles, such as the RSRM's of the Space Shuttle.

OBJECTS OF THE INVENTION

It is therefore one of the objects of this invention to provide a pressure-actuated joint system suitable for establishing a sealed joint at the interface of two mated bodies. In regards to this object, it would be especially advantageous to provide a pressure-actuated joint system suitable for use in pressure vessels generating high internal pressures, such as rocket engines.

It is a further object of this invention to provide a pressure vessel comprising a plurality of segments, in which at least one of the interfaces between segments comprises a joint, such as a field joint, sealed with the pressure-actuated joint system of this invention.

It is still a further object of this invention to provide a rocket motor, such as a reusable solid rocket motor, comprising a plurality of segments, in which at least one of the mating interfaces between the segments of the rocket motor comprises a joint, such as a field joint, sealed with the pressure-actuated joint system of this invention.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve foregoing objects, and in accordance with the purposes of the invention as embodied and broadly described in this document, a pressure vessel according to a first aspect of this invention comprises an outer case structure, a first annular rubber layer, and a second annular rubber layer. The outer case structure comprises a plurality of annular case segments, the annular segments including a first case segment and a second case segment, the first case segment mating with the second case segment. The first annular rubber layer is associated with and disposed radially inboard of the first case segment. The first annular rubber layer has an interfacing surface portion. The second annular rubber layer is associated with and disposed radially inboard of the second case segment, and has a thickness defined between a radial inner surface and a radial outer surface of the second annular rubber layer. The second annular rubber layer also has a slot extending from the radial inner surface across a portion of the thickness of the second annular rubber layer to define a main body portion and a flexible portion of the second annular rubber layer. The flexible portion has an interfacing surface portion abutting against the interfacing surface portion of the first annular rubber layer and is sufficiently flexible to follow movement of the first annular rubber layer during operation of the pressure vessel. The slot is positioned for receiving pressurized gas from the pressure vessel and for establishing a pressure-actuated joint between the interfacing surface portions. At least one of the interfacing surface portions has a plurality of recesses formed therein, the recesses being enclosed and sealed by the first annular rubber layer and the flexible portion of the second annular rubber layer.

To achieve other objects, and in accordance with the purposes of the invention as embodied and broadly described in this document, a rocket motor according to a second aspect of this invention is provided. The rocket motor comprises a rocket motor outer case structure including a plurality of annular case segments. The case segments include a first case segment and a second case segment. The first case segment mates with and is positioned aft relative to the second case segment. The rocket motor further comprises a first annular insulation layer and a second annular insulation layer. The first annular insulation layer is associated with and disposed radially inward of the first case segment. The second annular insulation layer is associated with and disposed radially inward of the second case segment. The second annular insulation layer also has a thickness defined between a radial inner surface and a radial outer surface of the second annular insulation layer. A slot extends from the radial inner surface of the second annular insulation layer in an outward direction across a portion of the thickness of the second annular insulation layer to define a main body portion and a flexible (finger) portion positioned aft of the main body portion. The flexible portion of the second annular insulation layer has an aft-facing surface that abuts against an interfacing portion of a forward-facing surface of the first annular insulation layer. The flexible portion is sufficiently flexible to follow movement of the first annular insulation layer during operation of the rocket motor. Recesses are provided in the forward-facing surface of the first annular insulation layer and/or the aft-facing surface of the second annular insulation. The first annular insulation layer and the second annular insulation layer together enclose the recesses.

A combustible propellant grain structure is positioned on a radial inner surface of the first and second annular insulation layers. The propellant grain structure has a center perforation and at least one annular channel extending from the center perforation to the slot for delivering pressurized gas to the slot during propellant combustion and for establishing a pressure-actuated joint between the aft-facing surface of the flexible portion and the interfacing portion of the forward-facing surface.

To achieve other objects, and in accordance with the purposes of the invention as embodied and broadly described in this document, a rocket motor according to a third aspect of this invention is provided. The rocket motor comprises a rocket motor case structure, first and second annular insulation layers, an annular sealing insert, and a propellant grain structure. The rocket motor outer case structure comprises a plurality of annular case segments, the annular case segments including a first case segment and a second case segment, the first case segment mating with and positioned aft relative to the second case segment. The first annular insulation layer is associated with and disposed radially inward of the first case segment. The first annular insulation layer has a forward-facing surface. The second annular insulation layer is associated with and disposed radially inward of the second case segment, and has a thickness defined between a radial inner surface and a radial outer surface of the second annular insulation layer. The second annular insulation layer also has a slot extending from the radial inner surface of the second annular insulation layer in an outward direction across a portion of the thickness of the second annular insulation layer to define a main body portion and a flexible portion. The flexible portion is positioned aft of the main body portion. The flexible portion has an aft-facing surface and is sufficiently flexible to follow movement of the first annular insulation layer during operation of the rocket motor. The annular sealing insert is received by at least one of the first and second annular insulating layer and has a first surface abutting against the forward-facing surface and a second surface that is opposite to the first surface and abuts against the aft-facing surface of the flexible portion. A plurality of substantially axial passages is formed through the annular sealing insert. The forward-facing surface of the first annular insulation layer and the aft-facing surface of the second annular insulation layer seal the ends of the passages. The combustible propellant grain structure is positioned on a radial inner surface of the first and second annular insulation layers. The propellant grain structure has a center perforation and at least one annular channel extending from the center perforation to the slot. The channel delivers pressurized gas to the slot during propellant combustion and establishes a pressure-actuated joint.

BRIEF DESCRIPTION OF THE DRAWINGS

The accompanying drawings are incorporated in and constitute a part of the specification. The drawings, together with the general description given above and the detailed description of the preferred embodiments and methods given below, serve to explain the principles of the invention. In such drawings.

DETAILED DESCRIPTION OF THE PREFERRED EMBODIMENTS OF THE INVENTION

Figure 1:
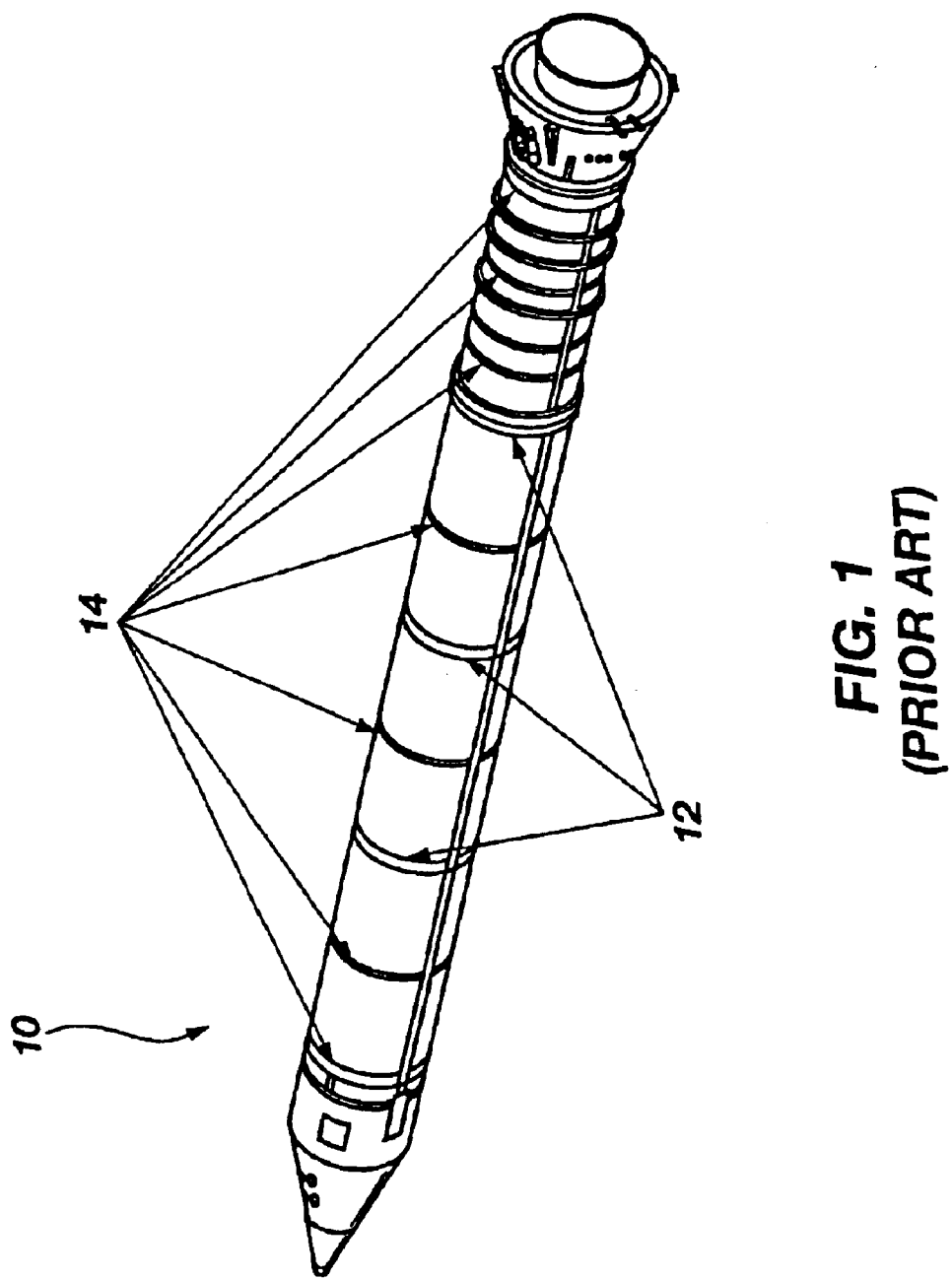
FIG. 1 is a perspective view of a conventional reusable solid rocket motor containing a plurality of field joints.
Figure 2:
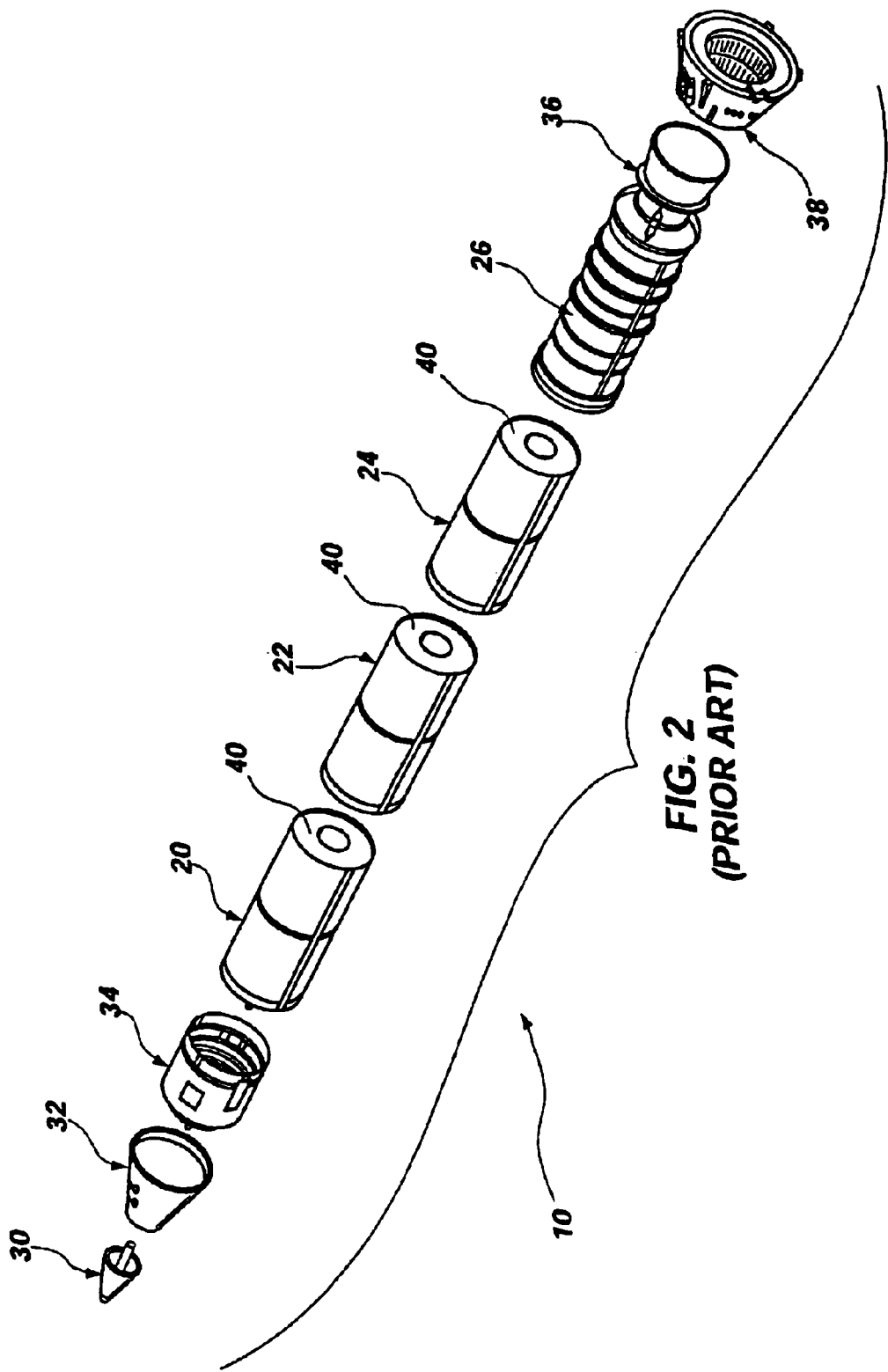
FIG. 2 is an exploded perspective view of the solid rocket motor of FIG. 1.

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

It is to be noted that, as used in the specification and the appended claims, the singular forms "a," "an," and "the" may include plural referents unless the context clearly dictates otherwise.

Figure 3:
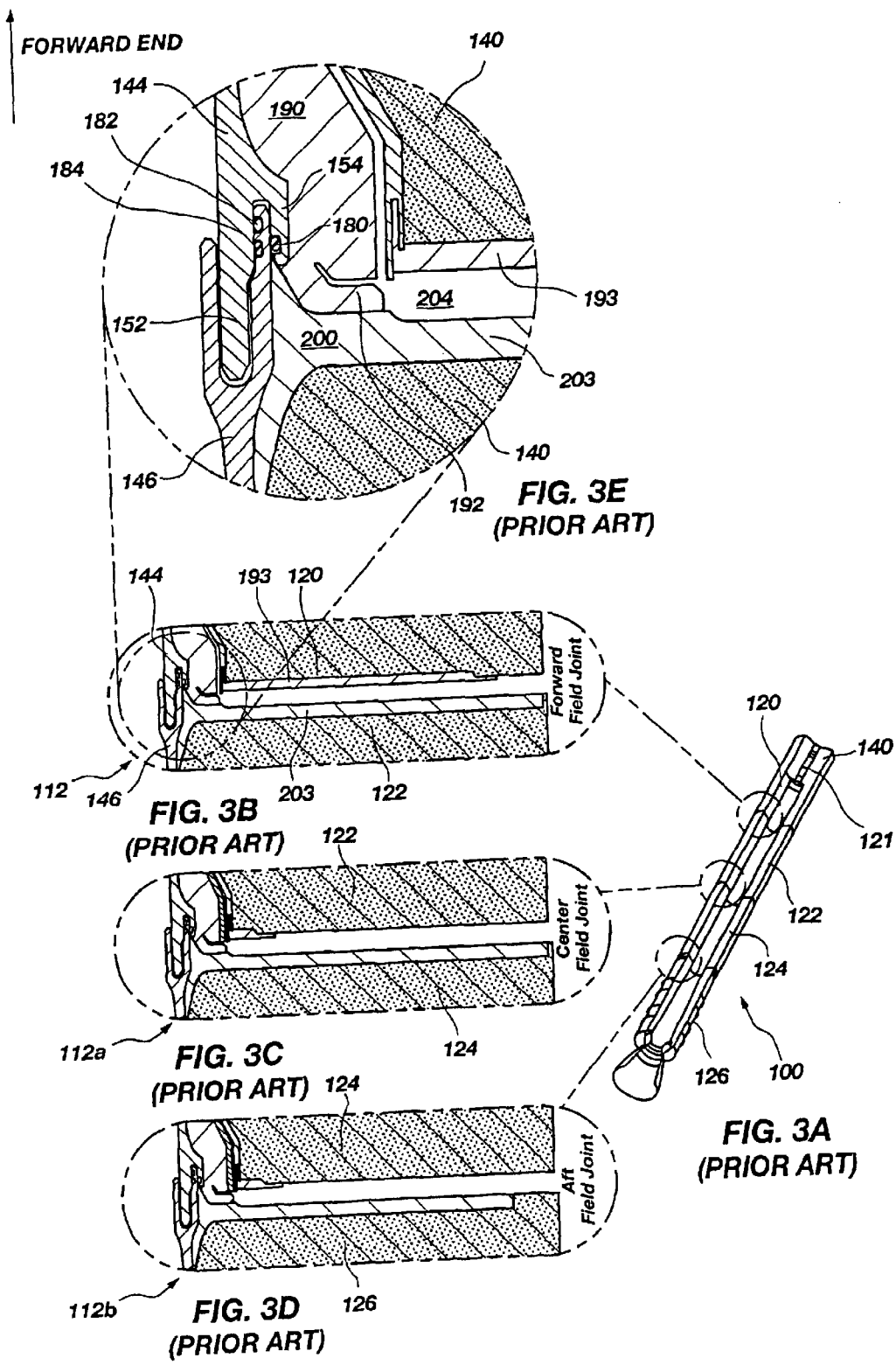
FIG. 3A is a partially cut-away view of the solid rocket motor comprising field joints having a pressure-actuated joint system constructed in accordance with a preferred embodiment of this invention.
FIG. 3B is a sectional view of one of the field joints shown in FIG. 3A, and in particular is a sectional view of a forward field joint connecting forward and forward-center segments of the solid rocket motor of FIG. 3A.
FIG. 3C is a sectional view of another one of the field joints shown in FIG. 3A, and in particular is a sectional view of a center field joint connecting forward-center and aft-center segments of the solid rocket motor of FIG. 3A.
FIG. 3D is a sectional view of still another one of the field joints shown in FIG. 3A, and in particular is a sectional view of an aft field joint connecting aft-center and aft segments of the solid rocket motor of FIG. 3A.
FIG. 3E is an enlarged view of the forward field joint of FIG. 3B.

FIG. 3A illustrates a rocket motor 100 containing pressure-actuated joint systems according to a preferred embodiment of this invention. The illustrated rocket motor 100 comprises a forward segment 120, a forward-center segment 122, an aft-center segment 124, and an aft segment 126. The segments 120, 122, 124, and 126 collectively contain a solid propellant grain structure, which is illustrated as a center-perforated propellant grain structure 140. The forward segment 120 may contain an igniter assembly 121. According to a preferred and illustrated embodiment, each of the segments 120, 122, 124, and 126 houses a portion or segment of the propellant grain structure 140. The field joint of this invention may be used with a wide array of propellant formulations. By way of example, a representative propellant formulation used in each solid rocket booster of the Space Shuttle includes perchlorate oxidizer, aluminum fuel, iron oxide burn rate catalyst, a polymer binder (polybutadiene-acrylonitrile-acrylic acid terpolymer (PBAN)), and an epoxy curing agent.

FIGS. 3B–3D respectively illustrate a forward field joint 112 connecting the forward segment 120 to the forward-center segment 122, a center field joint 112a connecting the forward-center segment 122 to the aft-center segment 124, and an aft field joint 112b connecting the aft-center segment 124 to the aft segment 126 of the rocket motor 100. Generally, each of the field joints 112, 112a, and 112b is substantially the same, with minor modifications commonly, but optionally, made in insulation construction and propellant formulation. Such modifications may be dependent upon various factors, such as the desired burn profile of the propellant grain, and are within the purview of those of ordinary skill in the art without requiring undue experimentation.

FIGS. 3E, 4, 5, 6A, and 6B are different views of the forward field joint 112 shown in FIG. 3B connecting the forward segment 120 and the forward-center segment 122. As shown in FIGS. 3E, 4, 5, 6A, and 6B, the outer case structure at the field joint 112 comprises forward case segment 144 and forward-center case segment 146. Each of the segments forming the outer case structure may be comprised of conventional and/or novel case materials proven reliable in rocket motor applications, such as medium-carbon steel containing nickel, manganese, chromium, and molybdenum. The case segments 144 and 146 may be mated together with suitable mating means. For example, in the illustrated embodiment the forward case segment 144 has a tang end portion, whereas the forward-center case segment 146 has a clevis end portion. The tang end portion of the forward case segment 144 and the clevis end portion of the forward-center case segment 146 are shown in mating engagement in FIGS. 4 and 5. Similar parts and mating structures may be used at the center field joint 112a (FIG. 3C) for engaging the forward-center and aft-center segments 122 and 124 and at the aft field joint 112b (FIG. 3D) for engaging the aft-center and aft segments 124 and 126.

Figure 6A:
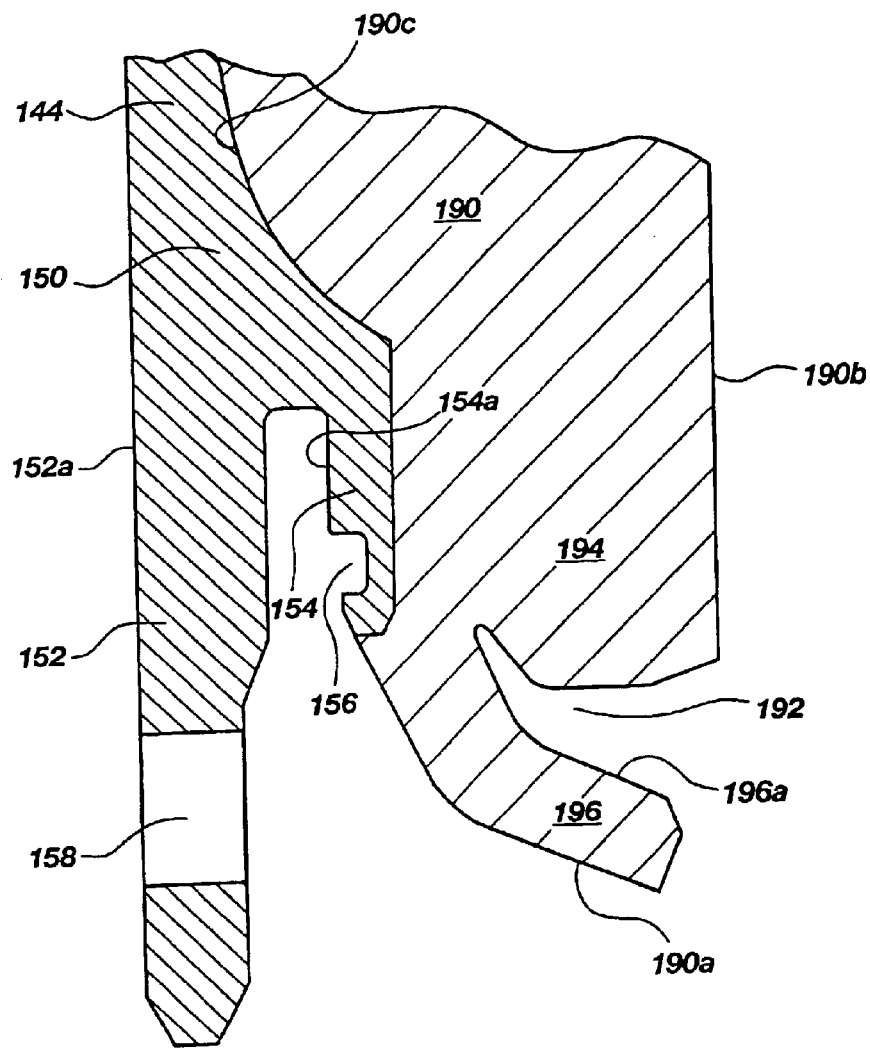
FIGS. 6A and 6B are isolated views of case segments of the field joint of FIGS. 4 and 5, but illustrating the case segments out of engagement.

The tang end portion of the forward case segment 144 comprises a main body portion 150. A captive leg 152 of the tang end portion extends axially from the main body portion 150. The tang end portion also includes a capture feature 154 extending substantially axially from the main body portion 150 and spaced radially apart and within the captive leg 152. The capture feature 154 has an outer surface 154a defining an annular O-ring groove 156 (FIG. 6A). A plurality of apertures, one of which is shown in FIG. 6A and designated by reference numeral 158, are spaced circumferentially apart from each other around the forward case segment 144 and extend through the captive leg 152.

Figure 6B:
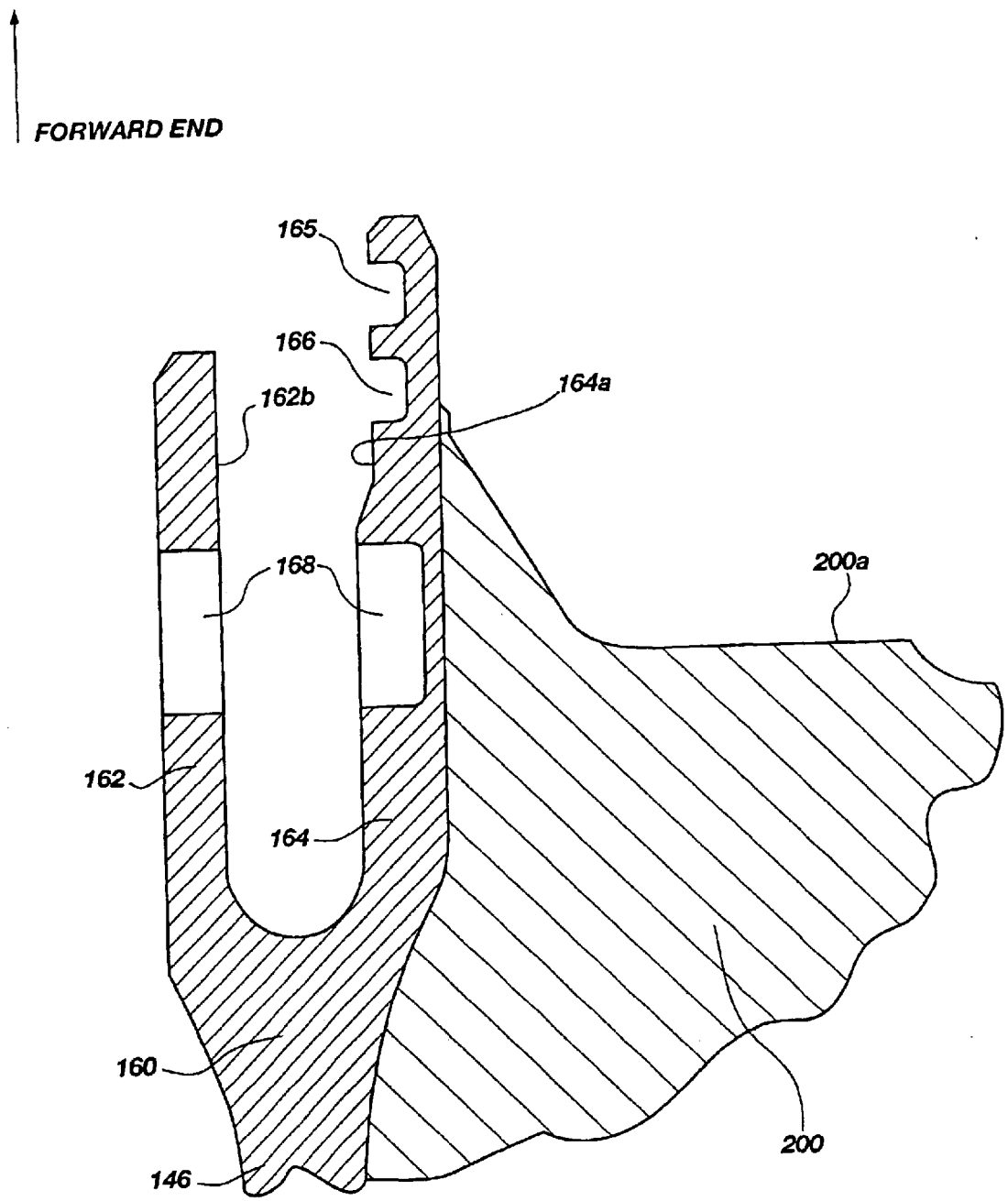

The clevis end portion of the forward-center case segment 146 includes a main body portion 160, with an outer prong 162 and inner prong 164 extending substantially axially from the main body portion 160. As shown in FIG. 6B, an outer surface 164a of the inner prong 164 defines annular O-ring grooves 165 and 166. A plurality of apertures, one of which is shown in FIG. 6B and designated by reference numeral 168, are spaced circumferentially apart from each other around the forward-center case segment 146 and extend through the outer prong 162 and into the inner prong 164.

Figure 4:
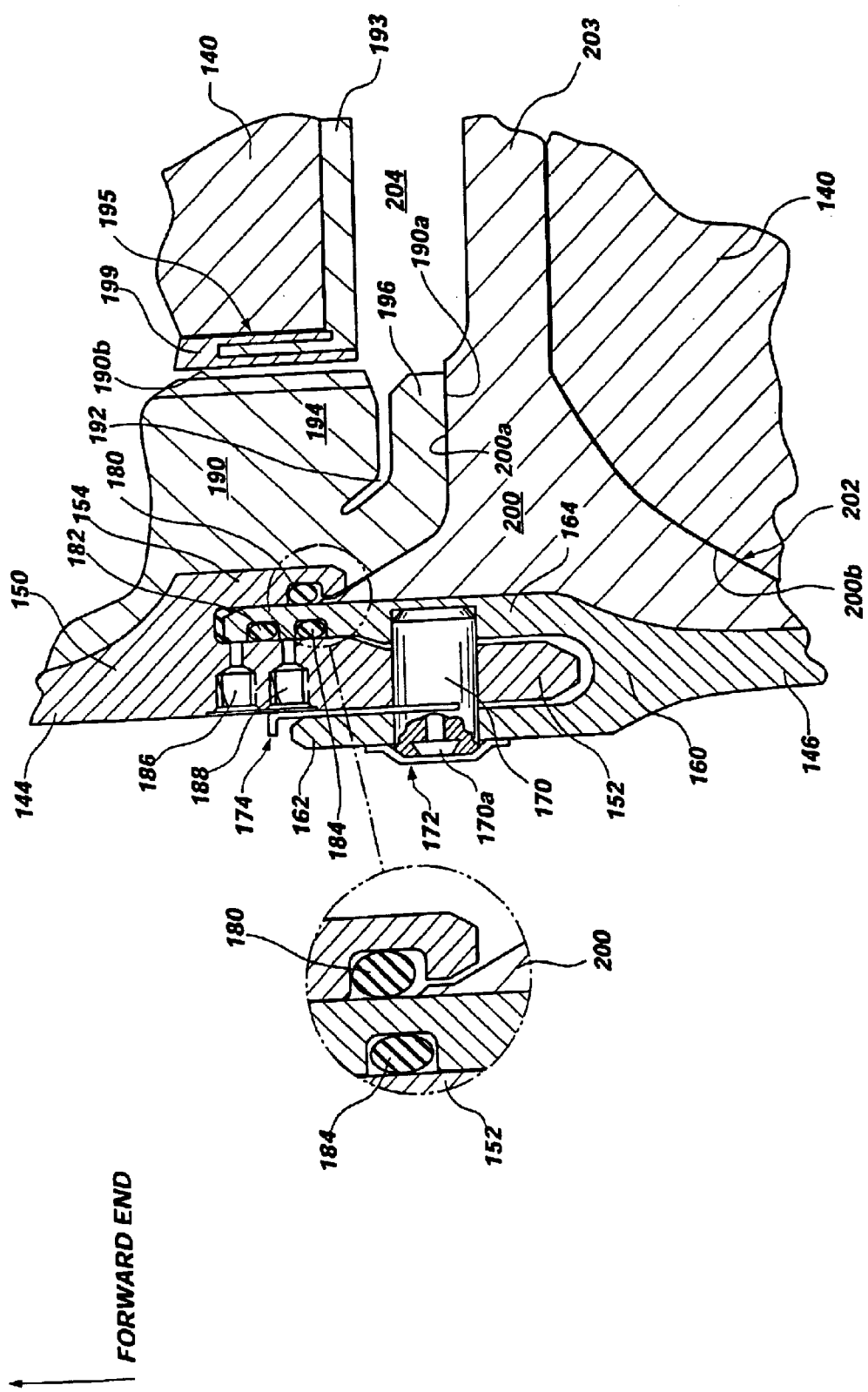
FIG. 4 is another enlarged sectional view of the field joint of FIGS. 3B and 3E, showing the field joint in greater detail.
Figure 5:
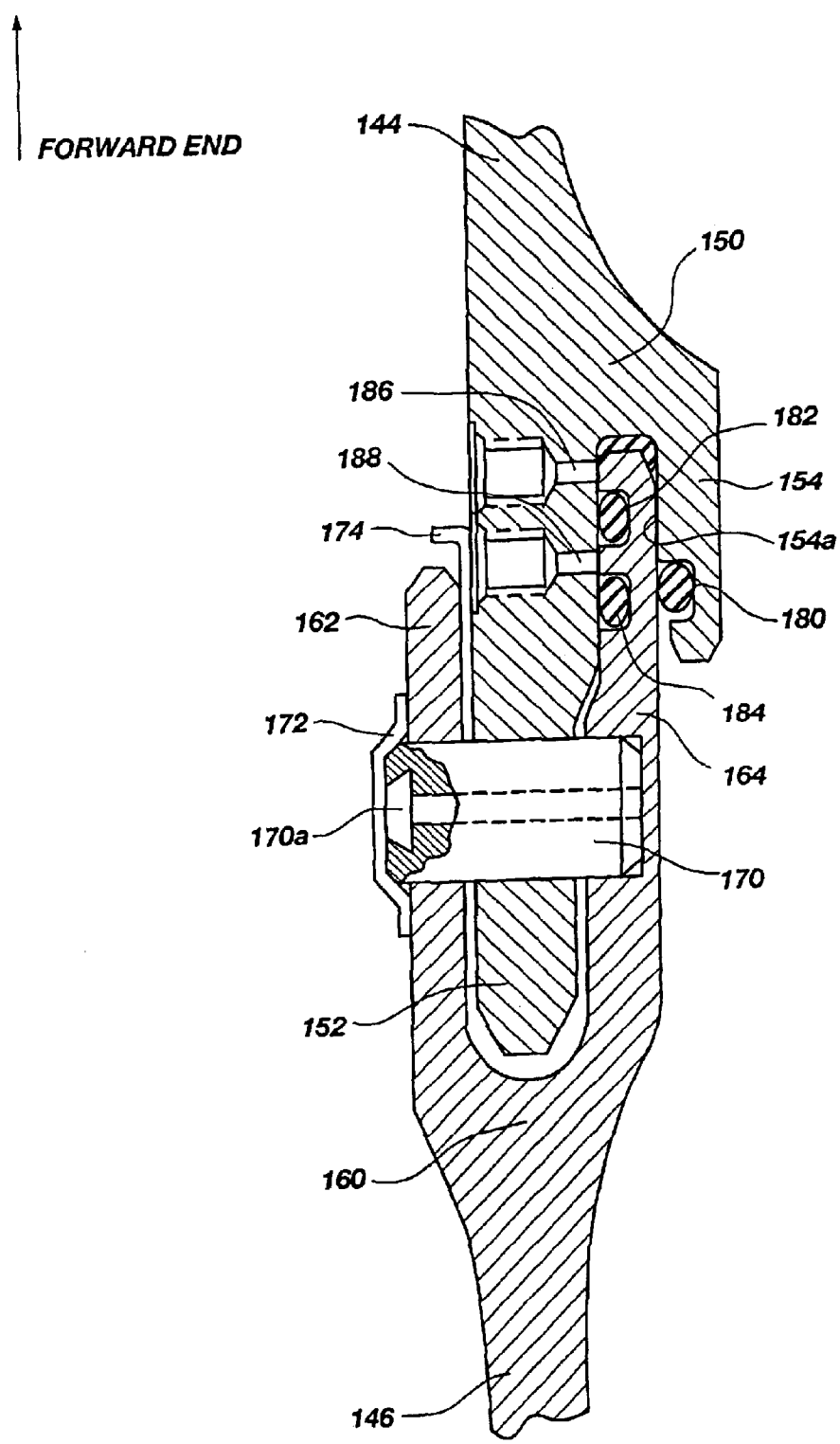
FIG. 5 is an isolated view of mated case segments of the field joint shown of FIG. 4.

In the mating arrangement shown in FIGS. 4 and 5, the captive leg 152 is sandwiched between the outer prong 162 and the inner prong 164. The capture feature 154 overlays the inner prong 164 of the clevis end portion of the forward-center case segment 146. The capture feature 154 restricts the clevis end portion of the forward-center case segment 146 from moving away from the tang end portion of the forward case segment 144, thus restricting joint rotation. In mating engagement, pairs of the apertures 158 and 168 of the case segments 144 and 146 fall into alignment. Into each set of aligned apertures 158 and 168 is received a respective bearing pin 170 for locking the case segments 144 and 146 into mating engagement. An RSRM of the Space Shuttle may contain as many as 177 bearing pins 170, with each pin 170 being made of nonferrous nickel-cobalt alloy. As shown in FIG. 5, the pins 170 each have a respective dovetail 170a located outboard of the outer prong 162 outer diameter. This dovetail 170a arrangement reduces stress on the pins 170 because the dovetail 170a lies outside of the high-stress area. A retainer band 172 wraps around outer surface 162a of the outer prong 162 and overlays the bearing pins 170 to secure the bearing pins 170 in place. A shim 174 is inserted between outer surface 152a of the captive leg 152 and the inner surface 162b of the outer prong 162. The shims 174 clip around each pin 170 to ensure a uniform gap for the O-ring seals around the motor case circumference. The shims 174 thereby stabilize the field joint 112 and contribute to control over the dimensions of the O-ring grooves 156, 165, and 166.

Seated within the O-ring grooves 156, 165, and 166 are capture O-ring 180, primary O-ring 182, and secondary O-ring 184, respectively. The grooves 156, 165, and 166 receiving the O-rings 180, 182, and 184 are dimensioned to maintain the O-rings 180, 182, and 184 under compression (squeeze) to provide seals. The captive leg 152 of the tang end portion includes a vent port 186 and leak check port 188 in close association with the primary O-ring 182 and the secondary O-ring 184. The vent port 186 provides for the release of air that might otherwise become trapped between the capture feature and the primary O-ring during assembly. The vent ports 186 and 188 also provide for leak testing of the O-rings and for ensuring proper positioning of the primary O-ring 182 in the proper sealing direction at ignition. Heaters, not shown but optionally mounted around the motor case at each field joint location, may be thermostatically controlled to maintain joint temperature, for example, at a temperature of at least about 24° C. (75° F.).

A forward-center (first) annular insulation layer 200 is associated with and disposed radially inward of the forward-center case segment 146. The forward-center annular insulation layer 200 has a forward-facing surface 200a (FIG. 6B) and a radially inner surface 200b (FIG. 4).

A forward (second) annular insulation layer 190 is associated with and disposed radially inward of the forward case segment 144. The forward annular insulation layer 190 has a thickness defined between a radial inner surface 190b and a radial outer surface 190c (FIG. 6A) thereof. An unvented deflection relief slot 192 having a radial outer portion and a flared terminal portion extends from the radial inner surface 190b in an outward direction across a portion of the thickness of the forward annular insulation layer 190. The slot 192 divides the forward annular insulation layer 190 into a main body portion 194 and a flexible finger portion 196 positioned aft of (yet integrally connected to) the main body portion 194. The flexible finger portion 196 has a substantially "J"-shaped cross-section, and an aft-facing surface 190a abutting against an interfacing portion of the forward-facing surface 200a of the forward-center annular insulation layer 200. The finger portion 196 is sufficiently flexible to follow movement of the interfacing portion of the forward-facing surface 200a of the forward-center annular insulation layer 200 during operation of the rocket motor 100.

Referring to FIG. 6A, the flexible finger portion 196 of the forward annular insulation layer 190 may be fabricated in a deflected position. When mated, the resilient nature of the finger portion 196 urges the aft-facing surface 190a towards the interfacing portion of the forward-facing surface 200a.

The insulation layers 190 and 200 protect the rocket motor case from thermal effects and erosion effects of particle streams generated by combustion of the propellant grain structure 140. Typically, the insulation layers 190 and 200 are bonded to the interior surfaces of the outer case segments 144 and 146. The insulation layers 190 and 200 are generally fabricated from a composition that, upon curing, is capable of enduring the high temperature gases and erosive particles produced while the propellant grain structure 140 burns. The insulation layers 190 and 200 may be the same or different, and may comprise, for example, nitrile butadiene rubber (NBR) or ethylene propylene diene monomer (EPDM) rubber. The rubber formulations may include fillers, such as asbestos, silica, and/or carbon fibers. Typically, uncured insulation is laid up in the RSRM segments, and vulcanized onto the case segmets 144 and 146. Suitable bonding systems, such as CHEMLOCK® primer and CHEMLOK® adhesive may be used to bond the insulation to the case structure.

Between the combustible propellant grain structure 140 and the radial inner surface 190b of the forward annular insulation layer 190 is a liner 195. Another liner 202 is interposed between the combustible propellant grain structure 140 and the radial inner surface 200b of the forward-center annular insulation layer 200. The liners 195 and 202 function to bond the propellant grain structure 140 to the insulating layer 190 and 200, respectively, and to any non-insulated interior surface portions (not shown) of the case structure. The liners 195 and 202 also typically have an ablative function, inhibiting burning of the insulation 190 and 200 at liner-to-insulation interfaces. Those skilled in the art are knowledgeable of suitable compositions and preparatory techniques for preparing liners. An exemplary liner composition is as follows: binder, carboxy-terminated polybutadiene polymer, with antioxidant; curing agents, 1-(2-methyl aziridinyl phosphine oxide (MAPO)) and epoxy resin liquid; filler, asbestos; thixotropic powder, modified castor oil (THIXCIN E); cure catalyst, iron hexoate.

Propellant stress relief flaps, such as illustrated by reference numeral 199 in FIG. 4, may be provided to reduce insulation-liner-propellant bondline loads. These loads may occur along propellant grain termination surfaces during propellant cure, thermal shrinkage, initial breakover, storage, transportation, and RSRM pressurization. The flaps 199 may be located at the aft end of each casting segment, as illustrated in FIGS. 3B–3E and 4.

In the illustrated embodiment, the propellant grain structure 140 has a center perforation and a plurality of annular channels or gaps 204. Each of the annular channels 204 is positioned at a respective one of the field joints. The annular channel 204 shown in FIG. 4 extends outward radially from the center perforation of the propellant grain structure 140 to the deflection relief slot 192.

Also illustrated in this embodiment are inhibitor layers 193 and 203, each of which is shaped as an annular radial disk. In FIG. 4, the inhibitor layers 193 and 203 are disposed on opposite sides of the annular channel 204, and may be applied after partial propellant cure. The inhibitor layers 193 and 203 may be used to thermally protect the propellant grain structure 140 and control the grain ignition. Example of suitable materials of which the inhibitor layers 193 and 203 may be made include NBR and carboxyl-terminated polybutadiene copolymer. The inhibitor layers 193 and 203 may also include other ingredients, for example, fillers such as asbestos. The inhibitor layers 193 and 203 may be designed to bond to and cure simultaneously with the propellant 140. As shown by a comparison of FIGS. 3B–3D, the inhibitor layers at each of the field joints may be designed the same or differently from each other, depending upon the particular burn profile desired of the rocket motor.

The mating insulation surfaces at each of the field joints may be bonded with a thin bondline of pressure-sensitive adhesive. More specifically, the adhesive may be provided at the interface of the aft-facing surface 190a of the forward annular insulation layer 190 and the forward-facing surface 200a of the forward-center annular insulation layer 200.

At motor ignition and during motor operation, pressurized gas generated by combustion of the propellant grain structure 140 is delivered to the deflection relief slot 192 along the annular channel 204. The pressurized gas fills the deflection relief slot 192 and applies a load against the walls of the slot 192, including the aft wall 196a (FIG. 6A) of the flexible finger portion 196. Pressurization of the slot 192 urges the aft-facing surface 190a of the flexible finger portion 196 against the forward-facing surface 200a of the forward-center annular insulation layer 200. In theory, a pressurized seal is thereby formed between the aft-facing surface 190a of the forward annular insulation layer 190 and the forward-facing surface 200a of the forward-center annular insulation layer 200. Thus, the flexible finger portion 196 functions as a pressure-actuated flap, preventing hot combustion gases from reaching the primary O-ring 182.

Simultaneously, the flexibility of the finger portion 196 provides a stress relief mechanism by enabling the joint insulation to accommodate joint movement. In particular, the finger portion 196 is sufficiently flexible to track movement of the mating forward-facing surface 200a of the forward-center annular insulation layer 200, especially during high stress conditions, such as ignition and tail-off.

Figure 7:
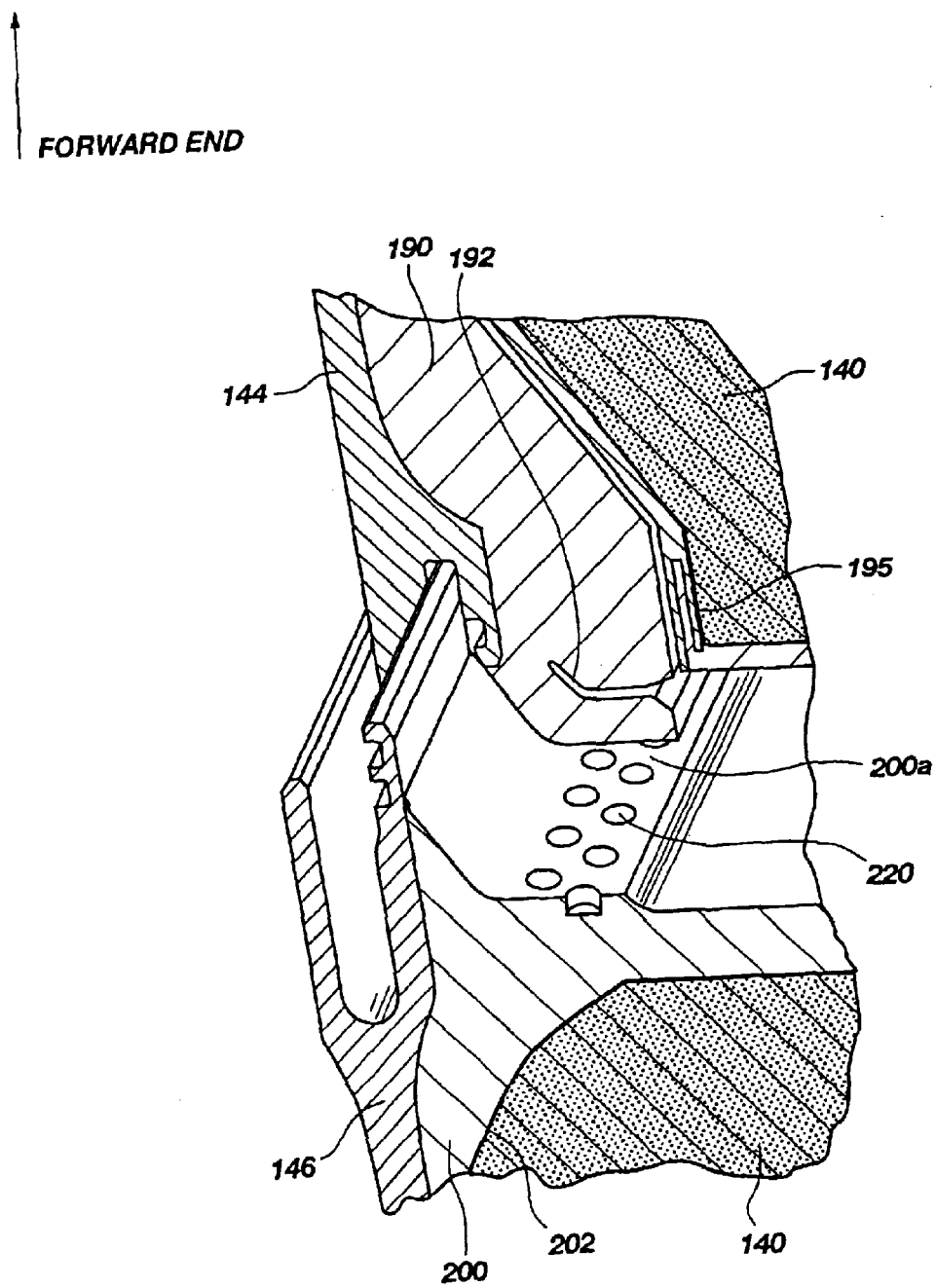
FIG. 7 is a partially cut-away view of the field joint of FIG. 4, showing recesses comprising discrete pockets in an interfacing surface portion of the insulation in accordance with one preferred embodiment of the invention.

In accordance with one preferred embodiment of this invention shown in FIG. 7, recesses 220 configured as cells or pockets are introduced into the field joint 112. In FIG. 7, each of these recesses 220 is formed in the forward-facing surface 200a of the forward-center annular insulation layer 200. The geometry of the free volume is such that upon back pressurization of the finger portion 196, such as established when gas is forced into the slot 192 during motor operation, air sealed in the recesses 220 does not change significantly in volume. As a consequence, the pressure within the pockets 220 does not change significantly. A pressure differential is thereby established on the opposite surfaces of the finger portion 196.

It has been found that in a conventional joint lacking these recesses, the capacity of the finger portion 196 to prevent intrusion of hot combustion gases may be dependent upon the attributes of the pressure-sensitive adhesive used as the joint sealant. If the finger portion 196 constituted a true pressure-actuated joint, then theoretically the properties of the joint sealant should not significantly affect the behavior of the joint. This suggests that the field joint finger portion 196 may not completely behave as a pressure-actuated system in the absence of the recesses.

Figure 8:
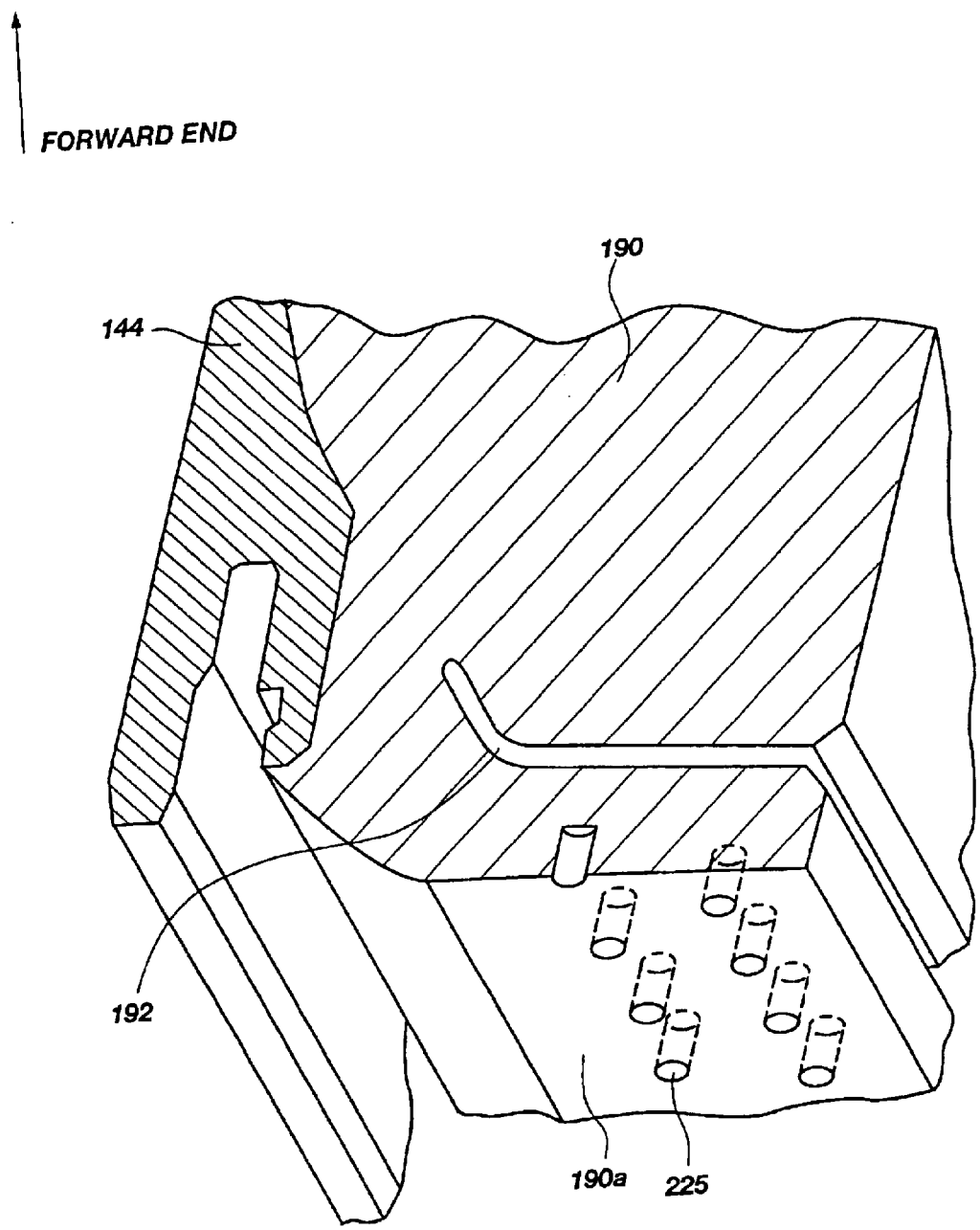
FIG. 8 is a sectional view showing the discrete pockets in an opposite interfacing surface portion of the insulation in accordance with another preferred embodiment of this invention.

To counteract the detrimental effects of introducing free volume into the joint, the free volume is introduced as discrete pockets or cells in FIG. 7. Therefore, in the unlikely event that a gas path should penetrate the joint 112, only a single pocket of free volume would be compromised at a time. The failure of one recess 220 or a few of the recesses 220 should not affect the other recesses 220, which will remain pressure-actuated. Although FIG. 8 shows two rows of recesses 220, it should be understood that only a single row or three or more rows may be practiced. It is also possible to arrange the recesses 220 in a pattern. Alternatively, the recesses 220 may be spaced in non-linear or random arrangement.

As shown in FIG. 8, recesses 225 alternatively may be formed in the aft-facing surface 190a of the forward annular insulation layer 190. It is also possible for the recesses 220 and 225 to be provided in both the forward-facing surface 200a and the aft-facing surface 190a. In the event that the recesses 220 and 225 are present in both the forward-facing surface 200a and the aft-facing surface 190a, the recesses 220 and 225 are preferably staggered (i.e., do not overlap) with respect to each other.

Figure 9:
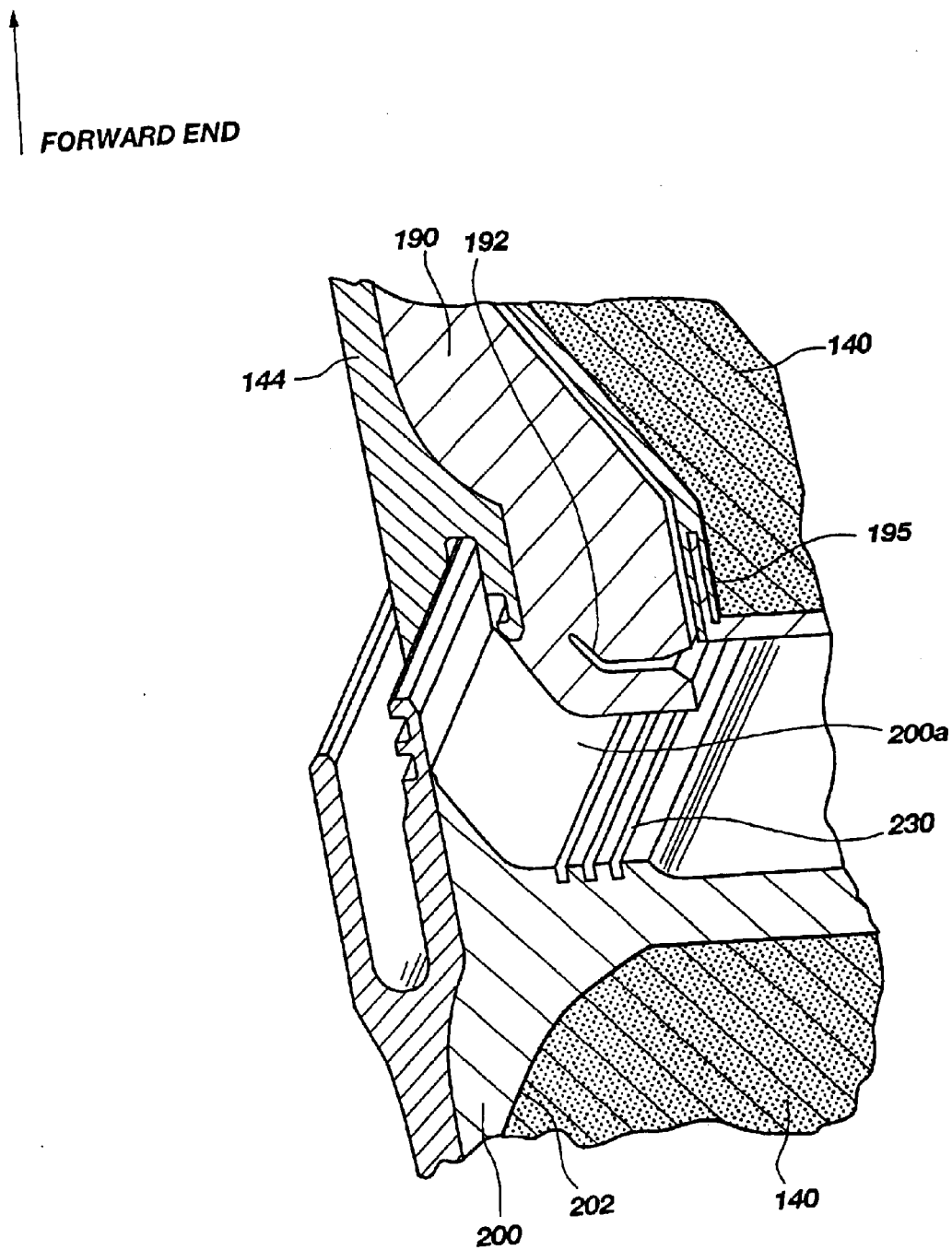
FIG. 9 is a partially cut-away view similar to FIG. 7, but showing the recesses configured as annular grooves spaced radially apart from one another.

It should also be understood that the recesses 220 are limited in shape and structure to that of a pocket. For example, the recesses 220 may have a polygonal, elongated, or random cross-sectional shape. The recesses 220 may all be shaped the same or different from each other, and may be non-uniform in section along their respective depths. FIG. 9 illustrates an embodiment of the invention in which the recesses are configured as a plurality of parallel grooves 230 formed in the forward-facing surface 200a.

Figure 10:
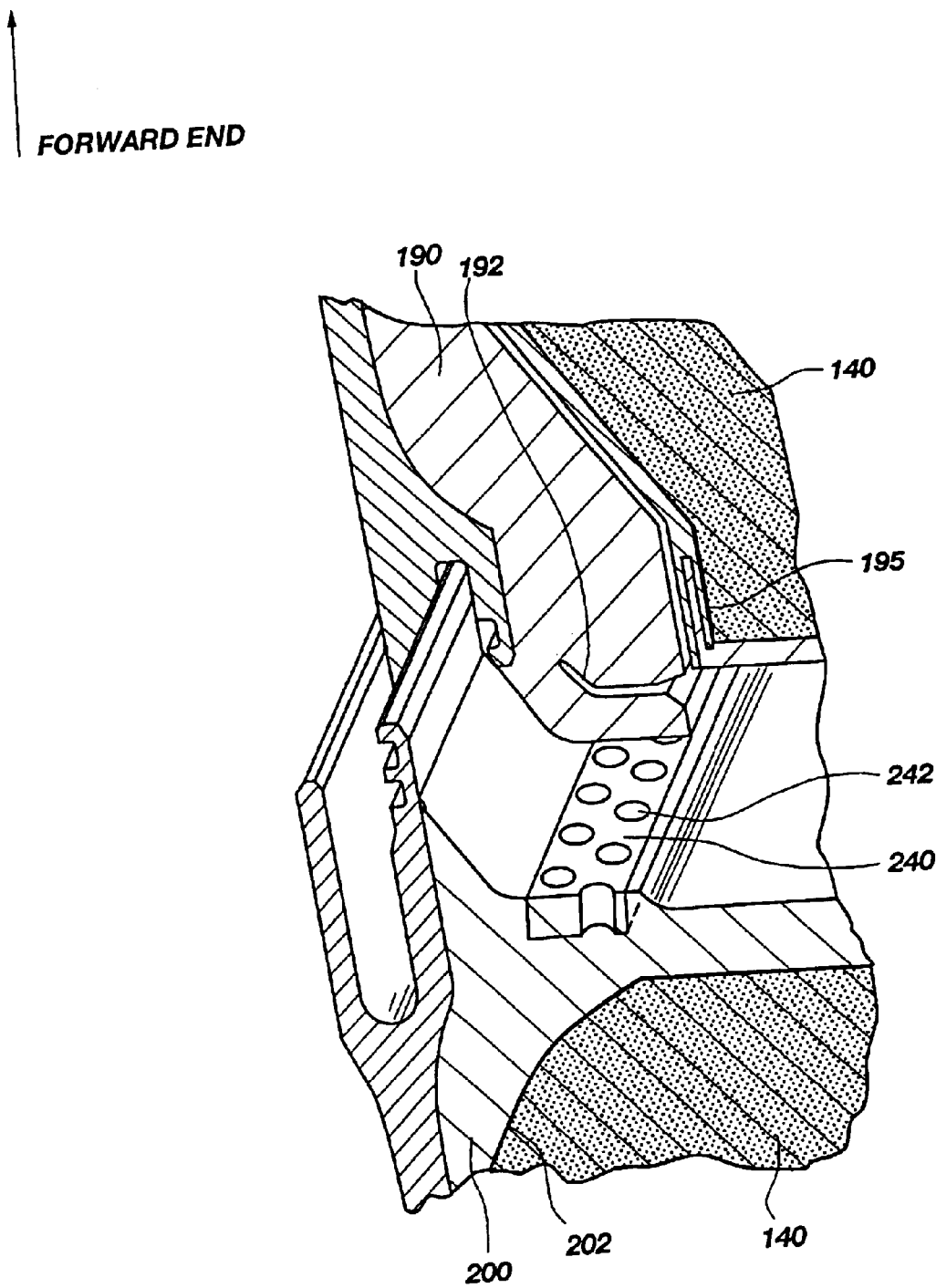
FIG. 10 is a partially cut-away view similar to FIG. 7, but showing an annular sealing insert having a plurality of substantially axial passages formed therethrough in accordance with still another preferred embodiment of the invention.

FIG. 10 illustrates still another embodiment of the invention, in which the forward-center annular insulation layer 200 has an annular groove (unnumbered) receiving an annular sealing insert 240. The insert 240 has axial passages 242 passing therethrough. The ends of the passages 242 are enclosed by the forward-facing surface 200a (of the groove) of the forward-center annular insulation layer 200 and the aft-facing surface 190a of the forward annular insulation layer 190, respectively. Although the axial passages 242 are configured as cylinders in the illustrated embodiment, it is to be understood that the axial passages may be the same or different from each other in shape, and may have, for example, a polygonal or random cross section. The axial passages 242 also need not be uniform in dimension along its length. It is also within the scope of this invention for a portion of the axial passages 242 to have a radial vector.

An alternative embodiment falling within the scope of this invention comprises providing an annular groove in the forward annular insulation layer 190 for receiving the insert 240. Still another alternative embodiment comprises providing each of the forward and forward-center annular insulation layers 190 and 200 with a respective channel, and partially receiving the insert 240 in both of the channels of the layers 190 and 200 simultaneously.

The foregoing detailed description of the preferred embodiments of the invention has been provided for the purposes of illustration and description, and is not intended to be exhaustive or to limit the invention to the precise embodiments disclosed. The embodiments were chosen and described in order to best explain the principles of the invention and its practical application, thereby enabling others skilled in the art to understand the invention for various embodiments and with various modifications as are suited to the particular use contemplated. It is intended that the scope of the invention cover various modifications and equivalents included within the spirit and scope of the appended claims.

What is claimed is:

1. A pressure vessel comprising:

an outer case structure comprising a plurality of annular case segments, the plurality of annular segments including a first case segment and a second case segment that mate with one another;

a first annular rubber layer associated with and disposed radially inboard of the first case segment, the first annular rubber layer having an interfacing surface portion; and a second annular rubber layer associated with and disposed radially inboard of the second case segment, the second annular rubber layer having a thickness defined between a radial inner surface and a radial outer surface of the second annular rubber layer, the second annular rubber layer also having a slot extending from the radial inner surface across a portion of the thickness of the second annular rubber layer to define a main body portion and a flexible portion of the second annular rubber layer, the flexible portion having an interfacing surface portion abutting against the interfacing surface portion of the first annular rubber layer and being sufficiently flexible to follow movement of the first annular rubber layer during operation of the pressure vessel, wherein the slot is positioned for receiving pressurized gas from the pressure vessel and for establishing a pressure-actuated joint between the interfacing surface portions, and wherein at least one of the interfacing surface portions has a plurality of recesses formed therein, the plurality of recesses being enclosed and sealed by the first annular rubber layer and the flexible portion of the second annular rubber layer.

2. The pressure vessel according to claim 1, further comprising a combustible structure positioned on a radial inner surface of the first annular rubber layer and on the radial inner surface of the second annular rubber layer.

3. The pressure vessel according to claim 1, further comprising a combustible structure positioned on a radial inner surface of the first annular rubber layer and on the radial inner surface of the second annular rubber layer, the combustible structure having a center perforation and an annular channel extending from the center perforation to the slot for delivering pressurized gas to the slot during combustion and for establishing a pressure-actuated joint between the interfacing surface portions.

4. The pressure vessel according to claim 1, wherein the plurality of recesses comprises a plurality of discrete pockets.

5. The pressure vessel according to claim 1, wherein the plurality of recesses comprises a plurality of discrete pockets, each of the plurality of discrete pockets having a circular face.

6. The pressure vessel according to claim 1, wherein the plurality of recesses comprises a plurality of annular grooves, the plurality of annular grooves being spaced radially apart from each other.

7. The pressure vessel according to claim 1, wherein only one of the interfacing surface portions has the plurality of recesses formed therein.

8. The pressure vessel according to claim 1, wherein both of the interfacing surface portions have the plurality of recesses formed therein.

9. A rocket motor having a forward end and an aft end, the rocket motor comprising:

a rocket motor outer case structure comprising a plurality of annular case segments, the plurality of annular case segments including a first case segment and a second case segment, the first case segment mating with and positioned aft relative to the second case segment;

a first annular insulation layer associated with and disposed radially inward of the first case segment, the first annular insulation layer having a forward-facing surface;

a second annular insulation layer associated with and disposed radially inward of the second case segment, the second annular insulation layer having a thickness defined between a radial inner surface and a radial outer surface of the second annular insulation layer, the second annular insulation layer also having a slot extending from the radial inner surface of the second annular insulation layer in an outward direction across a portion of the thickness of the second annular insulation layer to define a main body portion and a flexible portion positioned aft of the main body portion, the flexible portion having an aft-facing surface abutting against an interfacing portion of the forward-facing surface and being sufficiently flexible to follow movement of the first annular insulation layer during operation of the rocket motor; and a combustible propellant grain structure positioned on a radial inner surface of the first annular insulation, layer and on the radial inner surface of the second annular insulation layer, the propellant grain structure having a center perforation and at least one annular channel extending from the center perforation to the slot for delivering pressurized gas to the slot during propellant combustion and for establishing a pressure-actuated joint between the aft-facing surface of the flexible portion and the interfacing portion of the forward-facing surface, wherein at least one member selected from the group consisting of the forward-facing surface of the first annular insulation layer and the aft-facing surface of the second annular insulation layer has a plurality of recesses formed therein, the plurality of recesses being enclosed by the first annular insulation layer and the second annular insulation layer.

10. The rocket motor according to claim 9, wherein the outer case structure is comprised of steel.

11. The rocket motor according to claim 9, wherein the first case segment and the second case segment have a clevis end portion and a tang end portion, respectively.

12. The rocket motor according to claim 11, wherein the clevis end portion has an annular groove in which an O-ring is seated.

13. The rocket motor according to claim 11, wherein the tang end portion has an annular groove in which an O-ring is seated.

14. The rocket motor according to claim 9, wherein the first and second annular insulation layers are each comprised of a nitrile-butadiene rubber.

15. The rocket motor according to claim 9, wherein:

the first annular insulation layer comprises an inhibitor portion extending radially inward from the interfacing portion, the second annular insulation layer comprises an inhibitor portion extending radially inward from the main body portion, the at least one annular channel has a radial length, and the inhibitor portions of the first and second annular insulation layers are respectively positioned on opposite sides of the at least one annular channel and extend radially along at least a portion of the radial length of the at least one annular channel.

16. The rocket motor according to claim 9, further comprising a liner interposed between the combustible propellant grain structure and the radial inner surface of the first and second annular insulation layers.

17. The rocket motor according to claim 9, wherein the propellant grain structure comprises a plurality of distinct propellant segments.

18. The rocket motor according to claim 17, wherein each of the plurality of annular case segments is associated with a corresponding one of the plurality of propellant segments.

19. The rocket motor according to claim 9, further comprising a sealant disposed between the aft-facing surface of the flexible portion and the interfacing portion of the forward-facing surface.

20. The rocket motor according to claim 19, wherein the sealant comprises a pressure-sensitive adhesive.

21. The rocket motor according to claim 9, wherein the plurality of recesses comprises a plurality of discrete pockets.

22. The rocket motor according to claim 9, wherein the plurality of recesses comprises a plurality of discrete pockets, each of the plurality of discrete pockets having a circular face.

23. The rocket motor according to claim 9, wherein the plurality of recesses comprises a plurality of annular grooves, the plurality of annular grooves being spaced radially apart from each other.

24. A rocket motor having a forward end and an aft end, the rocket motor comprising:

a rocket motor outer case structure comprising a plurality of annular case segments, the plurality of annular case segments including a first case segment and a second case segment, the first case segment mating with and positioned aft relative to the second case segment;

a first annular insulation layer associated with and disposed radially inward of the first case segment, the first annular insulation layer having a forward-facing surface;

a second annular insulation layer associated with and disposed radially inward of the second case segment, the second annular insulation layer having a thickness defined between a radial inner surface and a radial outer surface of the second annular insulation layer, the second annular insulation layer also having a slot extending from the radial inner surface of the second annular insulation layer in an outward direction across a portion of the thickness of the second annular insulation layer to define a main body portion and a flexible portion positioned aft of the main body portion, the flexible portion having an aft-facing surface being sufficiently flexible to follow movement of the first annular insulation layer during operation of the rocket motor;

an annular sealing insert received by at least one of the first and second annular insulating layers and having a first surface abutting against the forward-facing surface and a second surface which is opposite to the first surface and abuts against the aft-facing surface of the flexible portion, the annular sealing insert having a plurality of substantially axial passages formed therethrough, the plurality of passages being sealed at ends thereof by the forward-facing surface of the first annular insulation layer and the aft-facing surface of the second annular insulation layer; and a combustible propellant grain structure positioned on a radial inner surface of the first annular insulation layer on the radial inner surface of the second annular insulation layer, the propellant grain structure having a center perforation and at least one annular channel extending from the center perforation to the slot for delivering pressurized gas to the slot during propellant combustion and for establishing a pressure-actuated joint.

* * * * *

UNITED STATES PATENT AND TRADEMARK OFFICE
CERTIFICATE OF CORRECTION

PATENT NO.    : 6,711,890 B2
DATED         : March 30, 2004
INVENTOR(S)   : John R. McGuire It is certified that error appears in the above-identified patent and that said Letters Patent is hereby corrected as shown below:

Column 9,
Line 9, after "propellant" and before "140" insert -- grain structure --

Column 12,
Line 27, delete the comma after "insulation"

Signed and Sealed this

Twenty-eighth Day of December, 2004

JON W. DUDAS
*Director of the United States Patent and Trademark Office*